(12) United States Patent
Yang et al.

(10) Patent No.: US 10,402,002 B2
(45) Date of Patent: Sep. 3, 2019

(54) SCREEN OPERATION METHOD FOR ELECTRONIC DEVICE BASED ON ELECTRONIC DEVICE AND CONTROL ACTION

(71) Applicant: Samsung Electronics Co., Ltd., Suwon-si (KR)

(72) Inventors: Ho Yang, Hwaseong-si (KR); Kyeong Yeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/888,686

(22) PCT Filed: Apr. 28, 2014

(86) PCT No.: PCT/KR2014/003712
§ 371 (c)(1),
(2) Date: Nov. 2, 2015

(87) PCT Pub. No.: WO2014/178584
PCT Pub. Date: Nov. 6, 2014

(65) Prior Publication Data
US 2016/0103552 A1    Apr. 14, 2016

(30) Foreign Application Priority Data
May 3, 2013    (KR) .......... 10-2013-0049932

(51) Int. Cl.
*G09G 5/00*    (2006.01)
*G06F 3/041*   (2006.01)
(Continued)

(52) U.S. Cl.
CPC .......... *G06F 3/0416* (2013.01); *G06F 3/0485* (2013.01); *G06F 3/04845* (2013.01);
(Continued)

(58) Field of Classification Search
USPC ....... 345/173, 473, 636, 156, 419, 179, 660, 345/676, 174, 765, 728, 753; 715/765;
(Continued)

(56) References Cited

U.S. PATENT DOCUMENTS 5,864,636 A  *  1/1999  Chisaka .............. G06F 3/04883
                                              345/179
6,886,061 B2    4/2005  Yokota et al.
(Continued)

FOREIGN PATENT DOCUMENTS

CN    101226442 A    7/2008
CN    103019594 A    4/2013
(Continued)

OTHER PUBLICATIONS

Partial Supplementary European Search Report dated Feb. 8, 2017 in counterpart European Application No. 14791692.8. (9 pages in English).

(Continued)

*Primary Examiner* — Thuy N Pardo
(74) *Attorney, Agent, or Firm* — NSIP Law

(57) ABSTRACT

A screen operation method for an electronic device based on the electronic device and a control action is disclosed. The electronic device may include an input data receiving module for receiving input data through the device from a user, a unit presentation recognizing module for recognizing a unit presentation from the input data in order to control the electronic device, and a screen controlling module for controlling the screen of the electronic device based on the control action with which the unit presentation is combined.

17 Claims, 12 Drawing Sheets

A. ZOOM IN-ZOOM OUT GROUP

Zoom in     Zoom out     Zoom to fit on screen

B. MOVE-ROTATE GROUP

Screen move to center   Screen move to arbitrary point by jumping   Screen move to arbitrary point by dragging   Rotation

C. UNDO-REDO GROUP

Undo     Redo

(51) Int. Cl.
*G06F 3/14* (2006.01)
*G06F 3/0485* (2013.01)
*G06F 3/0488* (2013.01)
*G06F 3/0484* (2013.01)

(52) U.S. Cl.
CPC ............ *G06F 3/04883* (2013.01); *G06F 3/14* (2013.01); *G06F 2203/04806* (2013.01)

(58) Field of Classification Search
USPC ........................................................ 707/728
See application file for complete search history.

(56) References Cited

U.S. PATENT DOCUMENTS

| | | | |
|---|---|---|---|
| 7,812,826 B2 | 10/2010 | Ording et al. | |
| 8,643,615 B2* | 2/2014 | Adamson | G06F 3/04883 345/173 |
| 2003/0025715 A1* | 2/2003 | Graham | G06F 3/04812 345/660 |
| 2004/0003142 A1 | 1/2004 | Yokota et al. | |
| 2010/0007665 A1* | 1/2010 | Smith | G06T 13/40 345/473 |
| 2010/0097322 A1 | 4/2010 | Hu et al. | |
| 2010/0207898 A1 | 8/2010 | Cha | |
| 2010/0315438 A1 | 12/2010 | Horodezky et al. | |
| 2011/0029917 A1 | 2/2011 | Um | |
| 2011/0109581 A1 | 5/2011 | Ozawa et al. | |
| 2011/0141144 A1* | 6/2011 | Tomono | G06F 3/0486 345/660 |
| 2011/0196864 A1* | 8/2011 | Mason | G06F 3/0416 707/728 |
| 2012/0050328 A1* | 3/2012 | Karoji | G06K 9/00402 345/636 |
| 2012/0056903 A1* | 3/2012 | Shinohara | G06F 3/013 345/676 |
| 2013/0047093 A1* | 2/2013 | Reuschel | G06F 3/04883 715/753 |
| 2013/0127836 A1* | 5/2013 | Joshi | G06T 11/203 345/419 |
| 2013/0155009 A1* | 6/2013 | Sevigny | G06F 3/044 345/174 |
| 2014/0055400 A1* | 2/2014 | Reuschel | G06F 3/041 345/173 |
| 2015/0254808 A1* | 9/2015 | Maack | G06T 3/4084 345/660 |
| 2016/0188181 A1* | 6/2016 | Smith | G06F 3/048 715/765 |

FOREIGN PATENT DOCUMENTS

| | | |
|---|---|---|
| DE | 101 40 874 A1 | 3/2003 |
| JP | 2003-225209 A | 8/2003 |
| JP | 2010-271774 A | 12/2010 |
| JP | 2011-39845 A | 2/2011 |
| JP | 2011-60322 A | 3/2011 |
| JP | 2011-165023 A | 8/2011 |
| JP | 2012-141739 A | 7/2012 |
| KR | 10-2004-0043532 A | 5/2004 |
| KR | 10-0964419 B1 | 6/2010 |
| KR | 10-1018928 B1 | 3/2011 |
| KR | 10-1132598 B1 | 4/2012 |
| KR | 10-2012-0059615 A | 6/2012 |

OTHER PUBLICATIONS

International Search Report dated Aug. 7, 2014, in counterpart International Application No. PCT/KR2014/003712 (5 pages, in Korean, including complete English translation).

Written Opinion of the International Searching Authority dated Aug. 7, 2014, in counterpart International Application No. PCT/KR2014/0033712 (5 pages, in Korean, no English translation).

Written Opinion of the International Searching Authority dated Aug. 7, 2014, in counterpart International Application No. PCT/KR2014/003712 (13 pages, in Korean, including complete English translation).

Chinese Office Action dated Mar. 26, 2018 in Chinese Patent Application No. 201480025183.0 (26 pages in English, 20 pages in Chinese).

* cited by examiner

FIG. 3

A. ZOOM IN-ZOOM OUT GROUP

Zoom in | Zoom out | Zoom to fit on screen

B. MOVE-ROTATE GROUP

Screen move to center | Screen move to arbitrary point by jumping | Screen move to arbitrary point by dragging | Rotation

C. UNDO-REDO GROUP

Undo | Redo

<Screen move to center>

<Screen move to arbitrary point by jumping>

<Screen move to arbitrary point by dragging>

<Rotation>

<Undo>

<Redo>

SCREEN OPERATION METHOD FOR ELECTRONIC DEVICE BASED ON ELECTRONIC DEVICE AND CONTROL ACTION

CROSS-REFERENCE TO RELATED APPLICATION(S)

This application is a U.S. national stage application of International Application No. PCT/KR2014/003712 filed on Apr. 28, 2014, which claims the benefit of Korean Patent Application No. 10-2013-0049932 filed on May 3, 2013, in the Korean Intellectual Property Office.

BACKGROUND

1. Field

The following description relates to an electronic device and a screen manipulation method of an electronic device based on a control operation, and more particularly, to manipulation of a screen of an electronic device by a user through an input device such as a mouse, a touch pen, a finger, and the like.

2. Description of Related Art

With recently increasing spread of electronic devices equipped with a touch screen using an input device, importance of a user interface (UI) for controlling the screen is increasing. In detail, the electronic devices provide the UI for enabling the user to manipulate the screen in various manners through the UI.

For example, when the user broadens two fingers in different directions, an image shown on the screen of the electronic device may be enlarged. However, such a method is difficult to be applied to the input device such as a touch pen or a mouse. Furthermore, when the user is incapable of freely moving two fingers, the above method may be impracticable.

Accordingly, there is a need for a method of manipulating a screen of an electronic device more conveniently and intuitively with any type of input device such as a finger, a mouse, and a touch pen.

SUMMARY

According to an aspect of the present invention, there is provided an electronic device including an input data receiver configured to receive input data from a user through an electronic device, a unit expression recognizer configured to recognize a unit expression for controlling the electronic device from the input data, and a screen controller configured to control a screen of the electronic device based on a control operation which is a combination of at least one unit expression.

The unit expression may include a closed curve, a line, and a point.

The screen controller may be configured to enlarge a particular area related to a closed curve when the control operation includes the user drawing the closed curve on the screen and then drawing a line from a boundary of the closed curve outward of the closed curve.

A zoom scaling factor of the particular area may be determined based on a distance from a center of the closed curve to the closed curve and a length of the line.

The screen controller may be configured to reduce a particular area related to a closed curve when the control operation includes the user drawing the closed curve and then drawing a line from a boundary of the closed curve inward of the closed curve on the screen.

A reduction ratio of the particular area may be determined based on a distance from a center of the closed curve to the closed curve and a length of the line.

The screen controller may be configured to move a particular area to a center of the screen and enlarge the particular area to a full screen when the control operation includes the user drawing a closed curve surrounding the particular area and then drawing a point out of the closed curve on the screen.

The screen controller may be configured to move a particular area to a center of the screen when the control operation includes the user drawing a closed curve surrounding the particular area and then drawing a point in the closed curve on the screen.

The screen controller may be configured to move a first particular area to a center of a closed curve surrounding a second particular area when the control operation includes the user drawing a closed curve surrounding the first particular area and then drawing the closed curve surrounding the second particular area on the screen.

The screen controller may move an entire screen along a drag track when the control operation includes the user drawing a point and then dragging the point to a predetermined position on the screen.

The screen controller may rotates the screen in a direction of drawing a line when the control operation includes the user drawing a closed curve and then drawing the line in a particular direction from a boundary of the closed curve along the closed curve.

An angle by which the screen is rotated may be determined to be an angle between a first vector from a center of the closed curve to a starting point of the line and a second vector from the center of the closed curve to an ending point of the line.

The screen controller may cancel a previous operation performed through the screen when the control operation includes the user drawing a closed curve and then a straight line passing through an inside of the closed curve on the screen.

The screen controller may redo a previous operation performed through the screen when the control operation includes the user drawing a closed curve and then a curved line extending into and then out of the closed curve on the screen.

The unit expression recognizer may recognize the unit expression in consideration of an input pattern related to continuity of the input data.

The unit expression recognizer may recognize the unit expression from the input data of the user, which is received after the electronic device is converted to a screen control mode by the user.

The unit expression recognizer may recognize the unit expression using an error correction role related to the unit expression.

According to an aspect of the present invention, there is provided an electronic device which recognizes a control operation which is a combination of a closed curve, a line, and a point, and controls a screen based on the control operation, wherein the control operation may include at least one selected from zoom in, zoom out, zoom to fit on screen, move to the center, move to the arbitrary point by jumping, move to the arbitrary point by dragging, rotate, undo, and redo.

According to an aspect of the present invention, there is provided a screen manipulation method for an electronic device, the screen manipulation method including receiving input data from a user through the electronic device, recognizing a unit expression for controlling the electronic device from the input data, and controlling the screen of the electronic device based on a control operation which is a combination of at least one unit expression.

The recognizing of the unit expression may include recognizing the unit expression including a closed curve, a line, or a point.

The control operation may include at least one selected from zoom in, zoom out, zoom to fit on screen, move to the center, move to the arbitrary point by jumping, move to the arbitrary point by dragging, rotate, undo, and redo.

BRIEF DESCRIPTION OF THE DRAWINGS

FIG. 3 is a diagram illustrating an example of groups of control operations performed by a user through an electronic device in accordance with an embodiment.

DETAILED DESCRIPTION

The following detailed description is provided in order to explain the embodiments by referring to the figures. Hereinafter, example embodiments will be described in detail with reference to the accompanying drawings. The term "electronic device" in the following description includes any devices including a touch type screen, such as a mobile phone, a smart pad, a personal digital assistant (PDA), a navigator, a monitor, an automatic teller machine (ATM), a television (TV), and the like. The term "input tool" includes anything that can be used by a user to manipulate a screen, such as a finger, a touch pen, a mouse, and the like.

Figure 1:
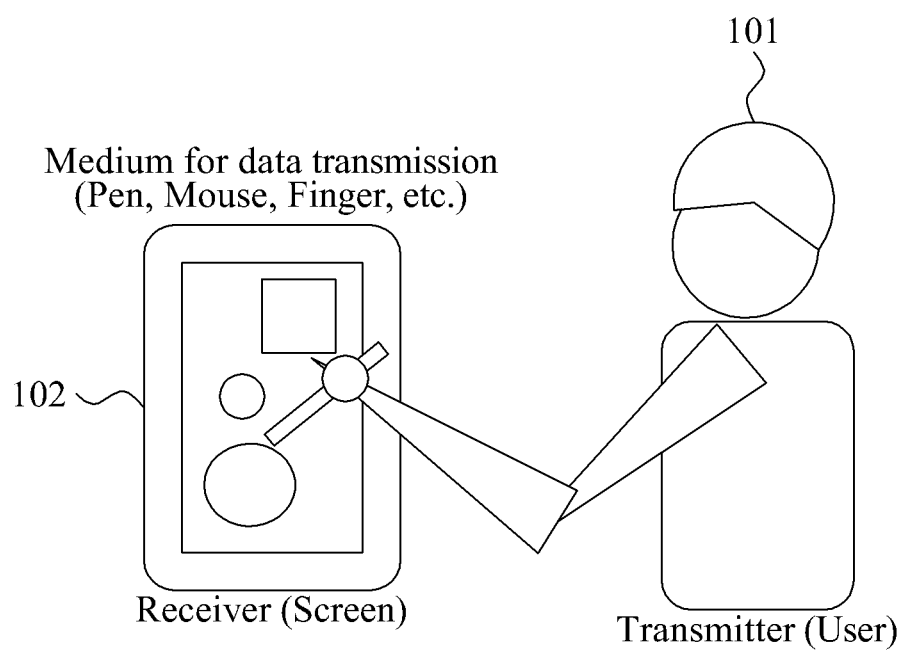
FIG. 1 is a diagram illustrating an example of a control operation performed on a screen by a user in accordance with an embodiment.

FIG. 1 illustrates an example of a control operation performed on a screen by a user 101 in accordance with an embodiment.

Referring to FIG. 1, the user 101 may manipulate the screen of an electronic device 102 using an input tool. The input tool may include a finger of the user 101, a touch pen, a mouse, and the like.

In FIG. 1, the user 101 may correspond to a transmitter that transmits data. The electronic device 102 may correspond to a receiver that receives and processes the data transmitted by the user 101. The data may refer to various manipulation types input by the user 101 through the input tool.

That is, referring to FIG. 1, the user 101 may transmit various manipulation types to the electronic device 102 through the input tool such as the finger, the touch pen, and the mouse, to enlarge, reduce, and rotate a document, a picture, and the like displayed on the screen of the electronic device 102. For this, the electronic device 102 may recognize at least one unit expression input by the user 101 through the input tool.

The term "unit expression" refers to simple geometric configurations including a closed curve, a line, and a point, input by the user 101 through the input tool. That is, the user 101 may apply intended screen manipulation by combining the unit expressions by the input tool.

In addition, not only a combination of the unit expressions but also an error correction rule may be applied when performing the screen manipulation. Therefore, although noise such as a shake is included when the user 101 inputs the unit expressions using the input tool, the electronic device 102 may correctly recognize the unit expressions intended by the user 101.

Therefore, according to the embodiment, the user 101 may perform only an operation indicating the unit expression on the screen for screen manipulation of the electronic device 102. In addition, although the unit expression expressed for the intended screen manipulation includes an error of a predetermined level, when the error is within an allowable range of the error correction rule, the electronic device 102 may correctly recognize the unit expression intended by the user 101.

Figure 2:
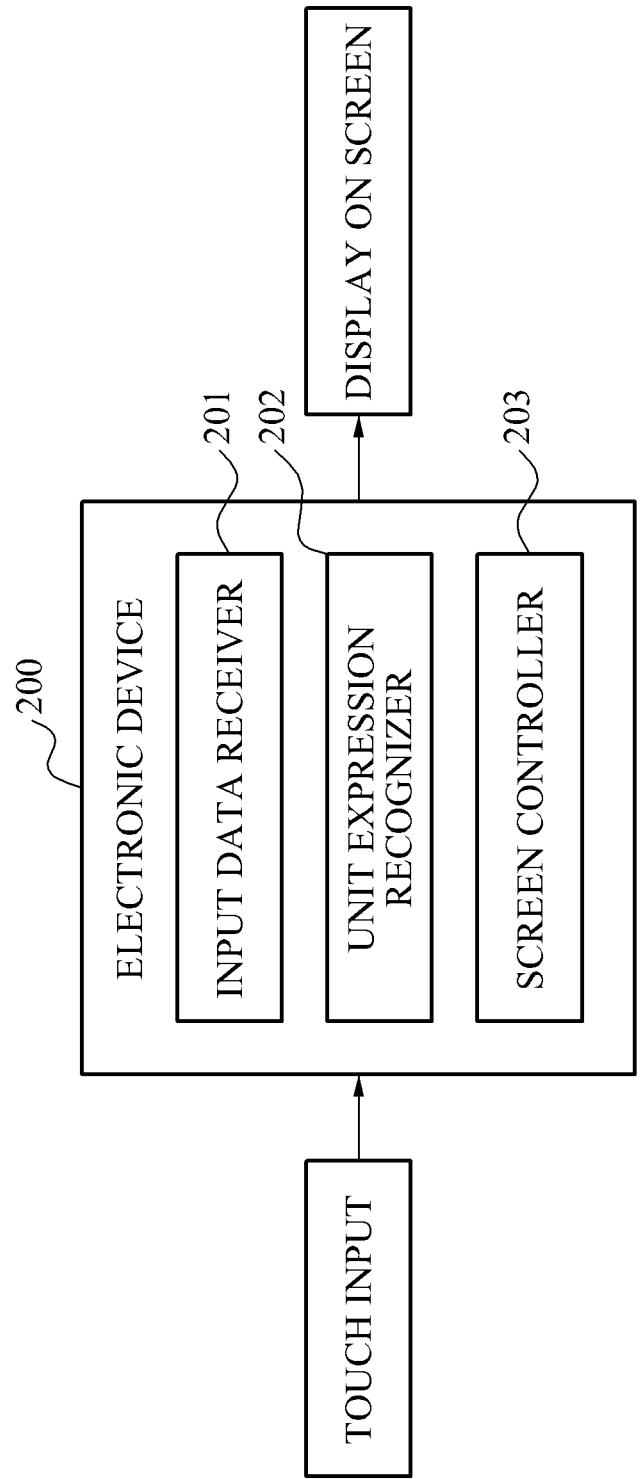
FIG. 2 is a diagram illustrating an example of a detailed structure of an electronic device in accordance with an embodiment.

FIG. 2 illustrates an example of a detailed structure of an electronic device 200 in accordance with an embodiment.

Referring to FIG. 2, the electronic device 200 includes an input data receiver 201, a unit expression recognizer 202, and a screen controller 203. The input data receiver 201 receives input data such as a touch input from a user. When the user performs various manipulations on the screen using an input tool such as a finger, a mouse, and a touch pen, the input data receiver 201 receives the various manipulations performed by the user as the input data.

The input data of the user may be or may not be displayed on the screen. Resolution of the input data may be adjusted so that contents already displayed on the screen are visible to the user. After the control operation related to the screen of the electronic device is completed, the input data of the user may disappear from the screen.

The unit expression recognizer 202 recognizes the unit expression from the input data received by the user. The input data may be one predetermined unit expression or a combination of at least two unit expressions.

For example, the unit expression may be in the form of a simple geometrical configuration input by the user through the input tool, such as a closed curve, a line, and a point. That is, the unit expression recognizer 202 may recognize a combination of the unit expressions from the input data that the user expressed on the screen.

To accomplish this, the unit expression recognizer 202 recognizes the unit expression by comparing a unit expression or unit expression rule pre-stored in a memory or a database (DB) with the unit expression input by the user.

The unit expression recognizer 202 may recognize the unit expressions according to an input order. For example, when the user inputs a closed curve and a point in sequence, the unit expression recognizer 202 may separately recognize the closed curve and the point from each other.

The unit expression recognizer 202 may recognize the unit expressions in consideration of an input pattern of the user. The input pattern may refer to continuity of the input data transmitted to the screen through the input tool by the user. That is, for example, the input pattern may be formed when the user touches the screen by a finger or a touch pen and finishes touching in a predetermined time, or when the user clicks a mouse and finishes the mouse click in a predetermined time.

For example, when the user inputs a line by touching the screen by a finger and separates the finger from the screen, the unit expression recognizer 202 may recognize a final unit expression after separation of the finger. This is because the user has to draw a line to input a closed curve. That is, the unit expression recognizer 202 may recognize the unit expression after the user inputs the line by touch and finishes the touch.

In addition, the unit expression recognizer 202 may recognize not only the presence of the unit expression on the screen but also a manner of inputting the unit expression. For example, when the unit expression is a closed curve, the unit expression recognizer 202 may determine whether the user has input the closed curve clockwise or counterclockwise. When the unit expression is a line, the unit expression recognizer 202 may determine whether the line input by the user is inside a closed curve or outside a closed curve. When the unit expression is a point, the unit expression recognizer 202 may determine whether the point input by the user is inside a closed curve or outside a closed curve.

For example, according to an embodiment, when the user contacts the screen by a finger or a touch pen for a predetermined time or draws a point by clicking a mouse for a predetermined time, the electronic device 200 may be converted from a general mode to a screen control mode. Alternatively, when the user draws a closed curve, the electronic device 200 may be converted from the general mode to the screen control mode. That is, when a unit expression corresponding to a start among a plurality of unit expressions constructing predetermined control operations is input, the electronic device 200 may be converted from the general mode to the screen control mode. The screen control mode may be an operation mode in which the user is capable of controlling the screen of the electronic device 200.

Next, after the electronic device 200 is converted to the screen control mode, the unit expression recognizer 202 recognizes the unit expression input by the user. In addition, when a unit expression corresponding to an end among the plurality of unit expressions constructing the predetermined control operations is input, the control operation is ended and the electronic device 200 is converted from the screen control mode to the general mode.

As another example, the electronic device 200 may be converted from the general mode to the screen control mode when the user manipulates a switch for converting the general mode to the screen control mode. Therefore, the unit expression recognizer 202 may recognize the unit expression input by the user in the screen control mode. The switch may be disposed at one or more particular positions such as a frame, a front side, a rear side, and the like of the electronic device 200. The user may convert the mode by manipulating one switch or at least two switches.

As still another example, when the user selects a mode conversion menu displayed on the screen of the electronic device 200, the electronic device 200 may be converted from the general mode to the screen control mode. Therefore, the unit expression recognizer 202 recognizes the unit expression input by the user in the screen control mode.

The unit expression input by the user is preset in the electronic device 200. However, to prevent incorrect recognition of a unit expression intended by the user caused by noise such as a shake, the unit expression recognizer 202 may use the error connection rule related to the unit expression.

The error connection rule may be defined as follows.
  (i) When an interval between a starting point and an ending point of a line is equal to or less than a predetermined distance, for example, about 5 dots, the line is considered as a closed curve.
  (ii) A closed curve may be in a predefined form such as a circle, an oval, a triangle, and a rectangle, or a non-predefined form, that is, a form that is not set as a predetermined shape.
  (iii) A difference in a shape of a closed curve is not taken into consideration. That is, when a closed curve stored in the DB or the memory of the electronic device 200 is different in a size or a shape from a closed curve input by the user, the input data of the user may be recognized as a closed curve. The closed curve may be determined according to whether the starting point and the ending point of the line are interconnected.
  (iv) When a closed curve or a line being drawn by the user is cut and restarts within a predetermined distance, for example, about 5 dots, the cut position and the restart position are considered to be interconnected.
  (v) When a radius of a closed curve is extremely small, that is, equal to or less than a predetermined distance, for example, about 5 dots, the unit expression may be recognized to be not the closed curve but a point.
  (vi) When the user intends to input a point, a unit expression input by the user may be recognized to be a point only when corresponding input data stays on a particular position for at least a predetermined time, for example, about 3 seconds. Otherwise, the unit expression may be recognized as noise.

For example, although the user may intend to draw a closed curve, a starting point and an ending point of the closed curve may not be connected. In this case, when the interval between the starting point and the ending point is within the predetermined distance, the unit expression recognizer 202 recognizes the input data of the user as a closed curve in accordance with the error correction rule.

The screen controller 203 determines a control operation for controlling the screen of the electronic device 200 in consideration of the unit expression recognized by the unit expression recognizer 202. Additionally, the screen controller 203 displays a screen image by performing the determined control operation on the electronic device 200. Examples of the control operation will be described in detail with reference to FIGS. 3 to 9.

FIG. 3 illustrates an example of groups of control operations performed by a user through an electronic device in accordance with an embodiment.

The groups of control operations include (i) a zoom in-zoom out group, (ii) a move-rotate group, and (iii) an undo-redo group.

The zoom in-zoom out group includes control operations of zoom in, zoom out, and zoom to fit on screen of a particular area. The move-rotate group includes control operations of move to the center, move to the arbitrary point by jumping, move to the arbitrary point by dragging, and rotate. The undo-redo group includes control operations of undo and redo.

Figure 4:
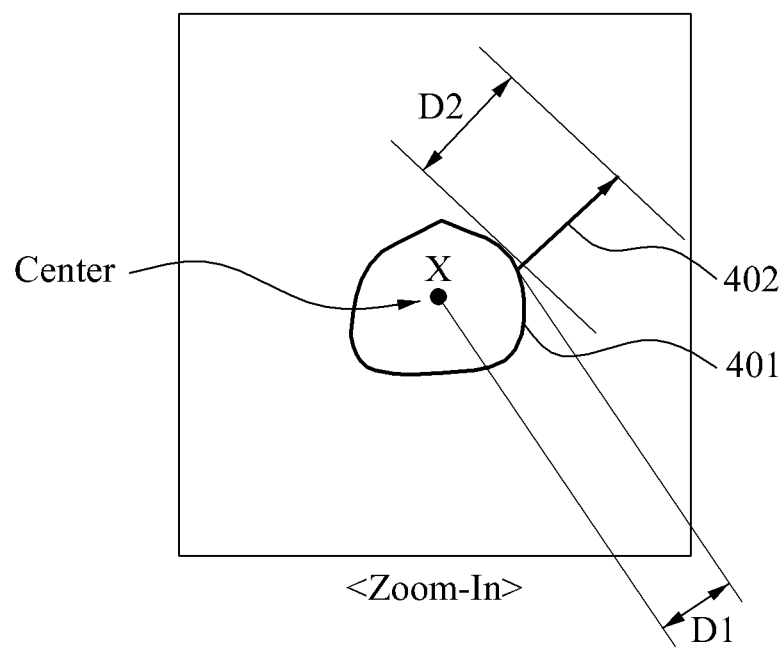
FIG. 4 is a diagram illustrating an example of a zoom-in operation in accordance with an embodiment.

FIG. 4 illustrates an example of a zoom-in operation in accordance with an embodiment.

The user draws a closed curve 401 and then a line 402 on a screen of an electronic device to enlarge a particular area. The line 402 is drawn outward from a boundary of the closed curve 401. Accordingly, the electronic device recognizes the closed curve 401 and the line 402 as separate unit expressions.

The particular area is enlarged based on a center X of the closed curve 401. The center X may be, for example, a center of gravity of a plane defined as the closed curve 401. A zoom-in scaling factor of the particular area is determined based on a distance D1 from the center X of the closed curve 401 to the closed curve 401 and a length D2 of the line 402 starting from the boundary of the closed curve 401.

For example, the zoom-in scaling factor $Z_{sf}$ may be defined as $Z_{sf}=1+D2/D1$. That is, the zoom-in scaling factor may be increased according to a decrease in D1 or an increase in D2.

Figure 5:
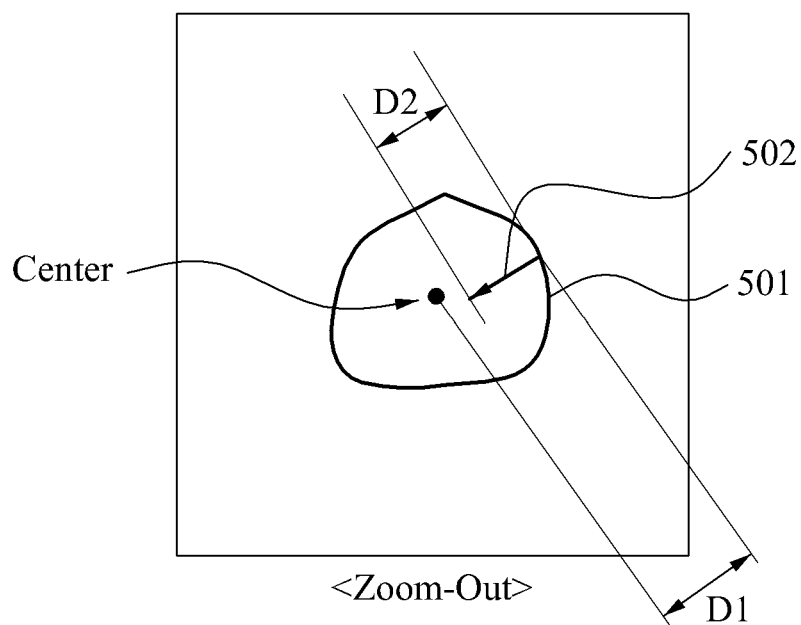
FIG. 5 is a diagram illustrating an example of a zoom-out operation in accordance with an embodiment.

FIG. 5 illustrates an example of a zoom-out operation in accordance with an embodiment.

The user draws a closed curve 501 and then a line 502 on a screen of an electronic device to reduce a particular area. The line 502 is drawn inward from a boundary of the closed curve 501. Accordingly, the electronic device recognizes the closed curve 501 and the line 502 as separate unit expressions.

The particular area is reduced based on a center X of the closed curve 501. The center X may be, for example, a center of gravity of a plane defined as the closed curve 501. A zoom-out scaling factor of the particular area is determined based on a distance D1 from the center X of the closed curve 501 to the closed curve 501 and a length D2 of the line 502 starting from the boundary of the closed curve 501.

For example, the zoom-out scaling factor $Z_{sf}$ may be defined as $Z_{sf}=1-D2/D1$. That is, the zoom-out scaling factor may be decreased according to a decrease in D1 or an increase in D2.

Figure 6:
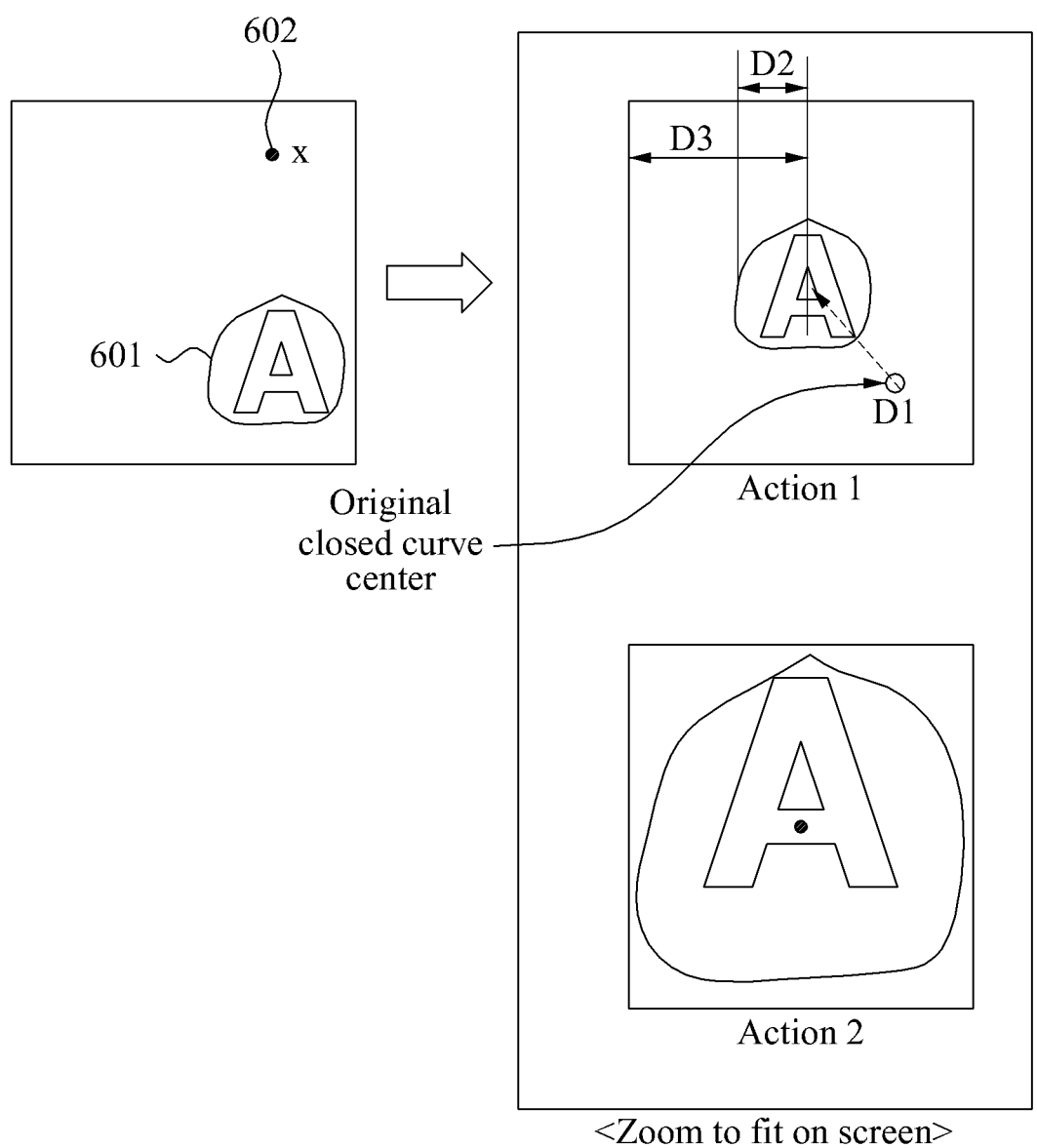
FIG. 6 is a diagram illustrating an example of a zoom-to-fit-on-screen operation of a particular area in accordance with an embodiment.

FIG. 6 illustrates an example of a zoom-to-fit-on-screen operation of a particular area in accordance with an embodiment.

The user draws a closed curve 601 around a particular area and then a point X 602 on a screen of an electronic device to enlarge the particular area to a full screen. The point X 602 is located in a predetermined position separated from the closed curve 601 on the screen. Therefore, the electronic device recognizes the closed curve 601 and the point 602 as separate unit expressions.

For example, the user draws the closed curve 601 to surround a letter 'A' and the point X 602 outside the closed curve 601 to enlarge the letter 'A' to the full screen. In this case, the letter 'A' surrounded by the closed curve 601 is moved to a center of the screen by Action 1, and enlarged to fit the full screen by Action 2. In Action 1, a center of the closed curve 601 is moved from D1 to a center of the screen.

In Action 2, a zoom-in scaling factor $Z_{sf}$ of the particular area surrounded by the closed curve 601 is defined as $Z_{sf}=D3/D2$.

As another example, the user draws the closed curve 601 to surround a particular area to be enlarged. Therefore, the particular area is enlarged to the full screen.

Figure 7:
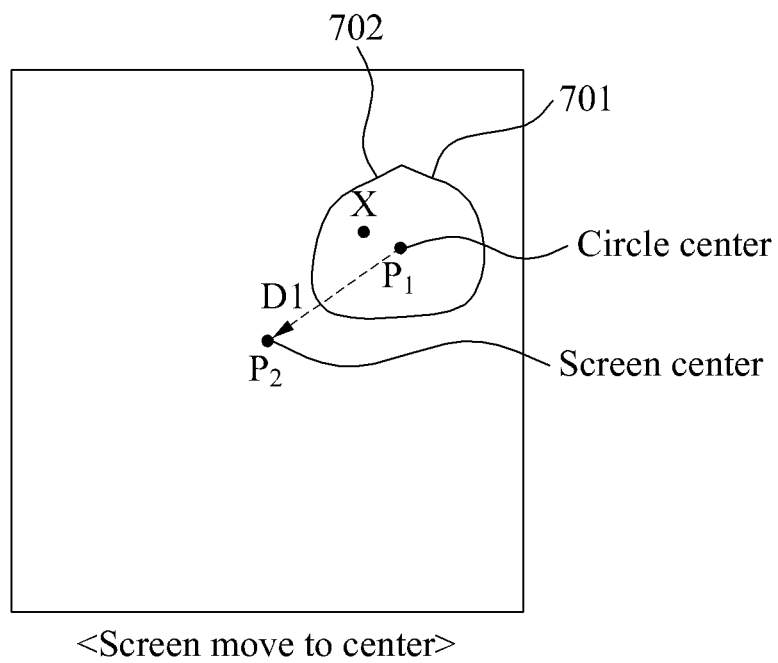
FIG. 7 is a diagram illustrating an example of a move-to-the-center operation in accordance with an embodiment.

FIG. 7 illustrates an example of a move-to-the-center operation in accordance with an embodiment.

As shown in FIG. 7, the user draws a closed curve 701 with respect to a particular area to instantly move to a center of a screen. Next, the user draws a point X 702 inside the closed curve 701. Therefore, the particular area is moved to the center of the screen. That is, a center of the closed curve 701 is mapped to the center of the screen.

A movement direction of the particular area is expressed by a vector from a center point P1 of the closed curve 701 to a center point P2 of the screen.

Figure 8:
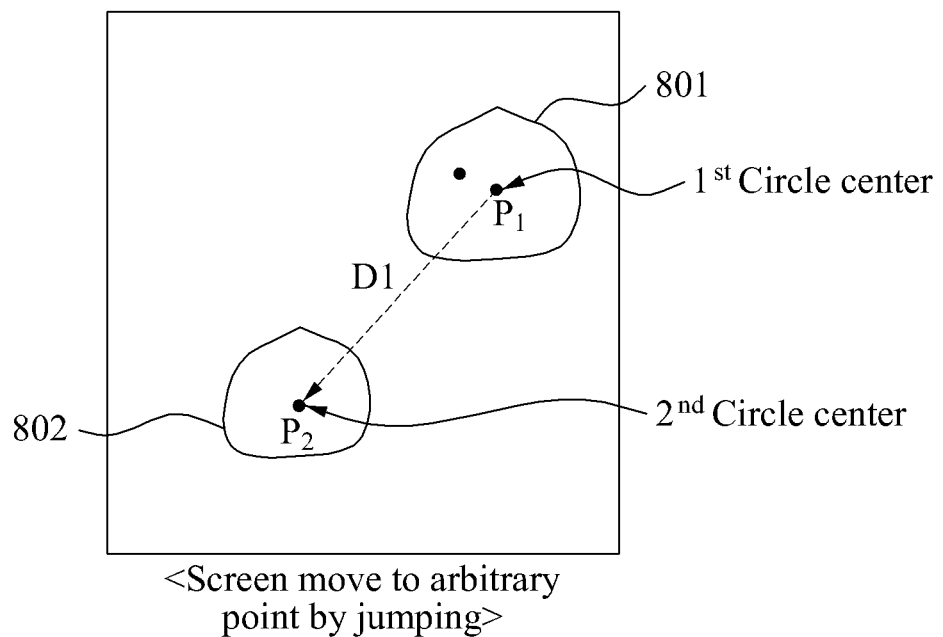
FIG. 8 is a diagram illustrating an example of a move-to-the-arbitrary-point-by-jumping operation in accordance with an embodiment.

FIG. 8 illustrates an example of a move-to-the-arbitrary-point-by-jumping operation in accordance with an embodiment.

As shown in FIG. 8, the user draws a closed curve 801 with respect to a particular area to jump to an arbitrary point. Next, the user draws a closed curve 802 corresponding to the arbitrary point. Accordingly, as a center point P1 of the closed curve 801 is mapped to a center point P2 of the closed curve 802, the particular area is moved to the arbitrary point. A movement direction of the particular area is expressed by a vector from a center point P1 of the closed curve 801 to a center point P2 of the closed curve 802.

Figure 9:
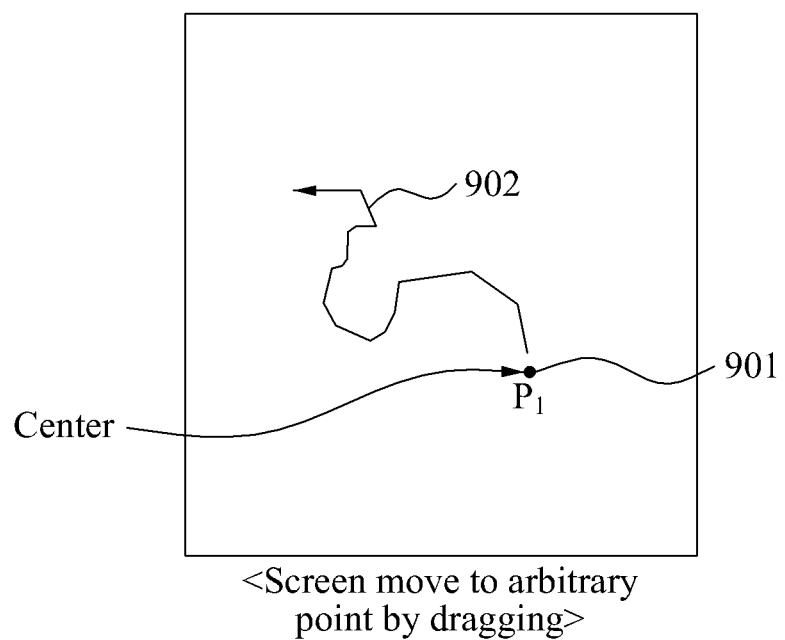
FIG. 9 is a diagram illustrating an example of a move-to-the-arbitrary-point-by-dragging operation in accordance with an embodiment.

FIG. 9 illustrates an example of a move-to-the-arbitrary-point-by-dragging operation in accordance with an embodiment.

The user maintains contact between a screen and a finger or a touch pen for a predetermined time or longer, or maintains a clicked state of a mouse for a predetermined time or longer. Next, the user may move an entire screen to an arbitrary point while maintaining the contact of the finger or the touch pen. In the same manner, the user may move the entire screen to the arbitrary point while maintaining the clicked state of the mouse. In FIG. 9, it is presumed that the user maintains the contact or the click state with respect to a center point P1 901 of a particular area.

Accordingly, the user may move the entire screen to the arbitrary point along a track 902 from the center point P1 901 of the particular area. That is, the entire screen may be moved to the arbitrary point according to the control operation of the user.

Figure 10:
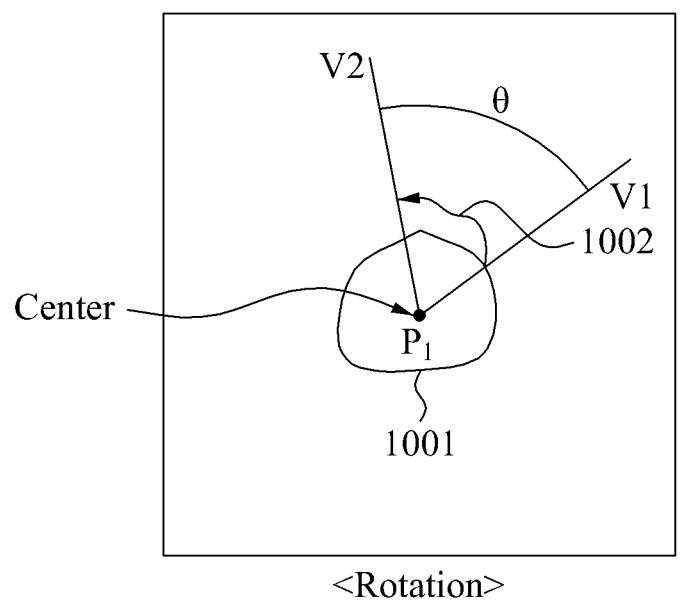
FIG. 10 is a diagram illustrating an example of a rotate operation in accordance with an embodiment.

FIG. 10 illustrates an example of a rotate operation in accordance with an embodiment.

The user draws a closed curve 1001 and then a line 1002 on a screen of an electronic device. The line 1002 is drawn from a boundary of the closed curve 1001 in a direction to rotate the screen by the user. For example, when the user intends to rotate the screen clockwise, the user draws the line 1002 clockwise from the boundary of the electronic device 1001. Conversely, when the user intends to rotate the screen counterclockwise, the user draws the line 1002 counterclockwise from the boundary of the electronic device 1001.

A rotation angle of the screen is determined as an angle between a first vector from a center point P1 of the closed curve 1001 to a starting point of the line 1002 and a second vector from the center point P of the closed curve 1001 to an ending point of the line 1002.

Figure 11:
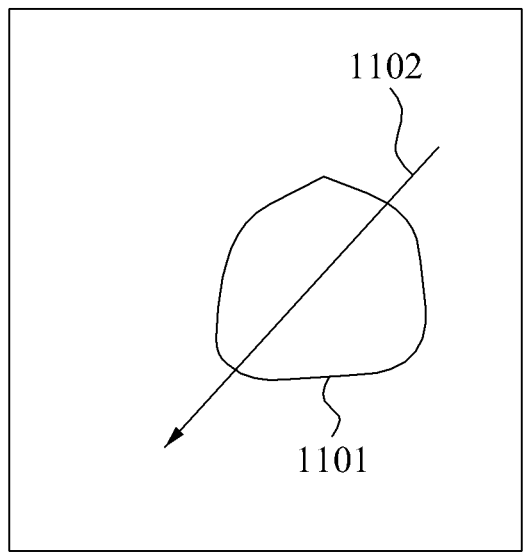
FIG. 11 is a diagram illustrating an example of an undo operation in accordance with an embodiment.

FIG. 11 illustrates an example of an undo operation in accordance with an embodiment.

Referring to FIG. 11, the user draws a closed curve 1101 and then a line 1102 on a screen of an electronic device. The line 1102 is a straight line extending through an inside of the closed curve 1101.

Therefore, the electronic device cancels a previous screen control operation performed through the screen. For example, when a particular image has been enlarged on the screen, the operation of enlarging the image is canceled and the image returns to a previous state.

Figure 12:
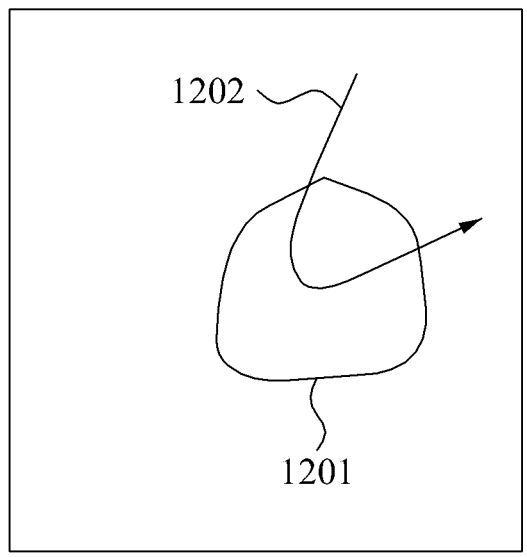
FIG. 12 is a diagram illustrating an example of a redo operation in accordance with an embodiment.

FIG. 12 illustrates an example of a redo operation in accordance with an embodiment.

Referring to FIG. 12, the user draws a closed curve 1201 and then a line 1202 on a screen of an electronic device. The line 1202 is a curved line extending into and then out of the closed curve 1201.

Therefore, the electronic device repeats a cancelled previous operation through the screen. For example, when a particular image has been enlarged and then cancelled, the electronic device repeats the cancelled operation of enlarging the image.

However, the electronic device needs to distinguish the line 1102 of FIG. 11 from the line 1202 of FIG. 12. For example, the electronic device may distinguish the lines 1102 and 1202 using an angle between a vector from a center of the closed curve to a starting point of the line and a vector from the center of the closed curve to an ending point of the line. For example, when an angle formed from the center of the closed curve to the starting point and to the ending point is equal to or less than a predetermined value, for example, 90°, the line drawn by the user is determined to be the line 1202 of FIG. 12. When the angle is greater than a predetermined value, for example, 90°, the line drawn by the user is determined to be the line 1102 of FIG. 11.

That is, according to the embodiments, a user may simply control a screen of an electronic device by performing a control operation which is a combination of a closed curve, a line, and a point, through an input tool such as a finger, a touch pen, a mouse, and the like.

The method according to the above-described embodiments may be recorded in non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations and methods described above, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. An electronic device comprising:
    an input data receiver configured to receive input data from a user;
    a unit expression recognizer configured to recognize at least two unit expressions from the input data, dependent on results of respectively comparing the at least two unit expressions with predetermined reference data, for controlling the electronic device, wherein the at least two unit expressions respectively includes any one or any combination of two or more of a closed curve, a line, and a point; and
    a screen controller configured to control a screen of the electronic device in response to a control operation that is a combination of the at least two unit expressions,
    wherein the screen controller is further configured to enlarge a particular area related to a closed curve in response to the control operation comprising the user drawing the closed curve on the screen and then drawing a first line from a boundary of the closed curve away from the closed curve on the screen, and
    wherein the screen controller is further configured to determine a zoom scaling factor of the particular area based on a distance from a center of the closed curve to the closed curve and a length of the first line.

2. The electronic device of claim 1, wherein the screen controller is further configured to reduce the particular area related to the closed curve in response to the control operation comprising the user drawing the closed curve on the screen and then drawing a second line from a boundary of the closed curve into the closed curve on the screen.

3. The electronic device of claim 2, wherein the screen controller is further configured to determine a reduction ratio of the particular area based on a distance from a center of the closed curve to the closed curve and a length of the second line.

4. The electronic device of claim 1, wherein the screen controller is further configured to move another particular area to a center of the screen and enlarge the other particular area to a full screen in response to the control operation comprising the user drawing a closed curve surrounding the other particular area on the screen and then drawing a point outside the closed curve on the screen.

5. The electronic device of claim 1, wherein the screen controller is further configured to move another particular area to a center of the screen in response to the control operation comprising the user drawing a closed curve surrounding the other particular area on the screen and then drawing a point inside the closed curve on the screen.

6. The electronic device of claim 1, wherein the screen controller is further configured to move a first particular area to a center of a closed curve surrounding a second particular area in response to the control operation comprising the user drawing a closed curve surrounding the first particular area on the screen and then drawing the closed curve surrounding the second particular area on the screen.

7. The electronic device of claim 1, wherein the screen controller is further configure to move an entire screen along a drag track in response to the control operation comprising the user drawing a point and then dragging the point to a predetermined position along the drag track on the screen.

8. The electronic device of claim 1, wherein the screen controller is further configured to rotate the screen in a direction of drawing a line in response to the control operation comprising the user drawing another closed curve on the screen and then drawing the line in a particular direction from a boundary of the other closed curve along the other closed curve.

9. The electronic device of claim 8, wherein the screen controller is further configured to determine an angle by which the screen is to be rotated to be an angle between a first vector from a center of the other closed curve to a starting point of the line and a second vector from the center of the other closed curve to an ending point of the line.

10. The electronic device of claim 1, wherein the screen controller is further configured to cancel a previous operation performed through the screen in response to the control operation comprising the user drawing another closed curve on the screen and then a straight line passing through an inside of the other closed curve on the screen.

11. The electronic device of claim 1, wherein the screen controller is further configured to repeat a previous operation performed through the screen in response to the control operation comprising the user drawing another closed curve on the screen and then a curved line extending into and then out of the other closed curve on the screen.

12. The electronic device of claim 1, wherein the unit expression recognizer is further configured to recognize the at least two unit expressions based on an input pattern related to continuity of the input data.

13. The electronic device of claim 1, wherein the unit expression recognizer is further configured to recognize the at least two unit expressions from the input data of the user received after the electronic device is converted to a screen control mode by the user.

14. The electronic device of claim 1, wherein the unit expression recognizer is further configured to recognize the at least two unit expressions using an error correction rule related to the at least two unit expressions.

15. An electronic device configured to recognize a control operation that is a combination of at least two unit expressions, the at least two unit expressions being recognized, dependent on results of respectively comparing the at least two unit expressions with predetermined reference data, from input data, and the at least two unit expressions respectively including any one or any combination of two or more of a closed curve, a line, and a point, and configured to control a screen in response to the control operation;
    wherein the control operation is selected from any one or any combination of two or more of zoom in, zoom out, zoom to fit on the screen, move to a center of the screen, move to an arbitrary point on the screen by jumping, move to an arbitrary point on the screen by dragging, rotate, undo, and redo,
    wherein the control operation comprises enlarging a particular area related to a closed curve in response to the control operation comprising the user drawing the closed curve on the screen and then drawing a first line from a boundary of the closed curve away from the closed curve on the screen, and
    wherein a zoom scaling factor of the particular area is determined based on a distance from a center of the closed curve to the closed curve and a length of the first line.

16. A screen manipulation method for an electronic device, the screen manipulation method comprising:
    receiving input data from a user;
    recognizing at least two unit expressions from the input data, dependent on results of respectively comparing the at least two unit expressions with predetermined reference data, for controlling the electronic device, wherein the at least two unit expressions respectively include any one or any combination of two or more of a closed curve, a line, and a point; and
    controlling a screen of the electronic device in response a control operation that is a combination of the at least two unit expressions,
    wherein the controlling comprising enlarging a particular area related to a closed curve in response to the control operation comprising the user drawing the closed curve on the screen and then drawing a first line from a boundary of the closed curve away from the closed curve on the screen, and
    wherein a zoom scaling factor of the particular area is determined based on a distance from a center of the closed curve to the closed curve and a length of the first line.

17. The screen manipulation method of claim 16, wherein the control operation is selected from any one or any combination of two or more of zoom in, zoom out, zoom to fit on the screen, move to a center of the screen, move to an arbitrary point on the screen by jumping, move to an arbitrary point on the screen by dragging, rotate, undo, and redo.

* * * * *